J. M. HUNTER.

Boots and Shoes.

No. 9,035. Reissued Jan. 6, 1880.

*Witnesses:*

K. M. Coplinger.

R. Connett.

*Inventor:*

J. Morrison Hunter

Per-

Burke, Fraser & Connett

Attys

UNITED STATES PATENT OFFICE.

JOHN MORRISON HUNTER, OF MORRISTOWN, NEW JERSEY.

BOOT AND SHOE.

SPECIFICATION forming part of Reissued Letters Patent No. 9,035, dated January 6, 1880.

Original No. 122,948, dated January 23, 1872. Application for Reissue filed September 27, 1879.

DIVISION B.

*To all whom it may concern:*

Be it known that I, JOHN MORRISON HUNTER, of Morristown, in the county of Morris and State of New Jersey, have invented certain Improvements in Revolving Heel-Plates for Boots and Shoes, of which the following is a specification.

The object of this invention is to produce a plate that will wear well and evenly and present a neat appearance.

The plate consists partly of metal and partly of leather, rubber, or some similar material, fits snugly to the heel, and rotates on a central screw or axis, all as will be hereinafter more fully set forth.

Figure 1:
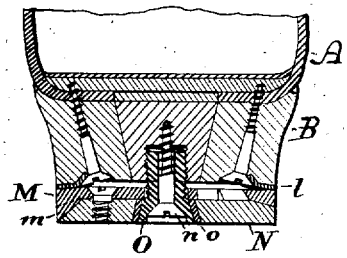
Figure 2:
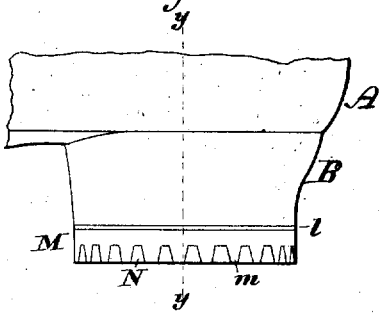
Figure 3:
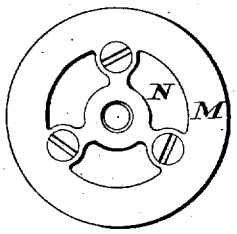
Figure 4:
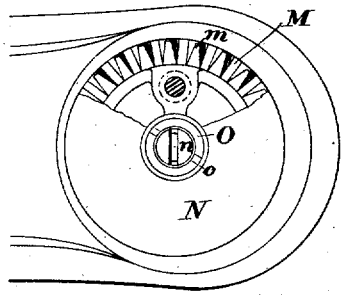
Figure 5:
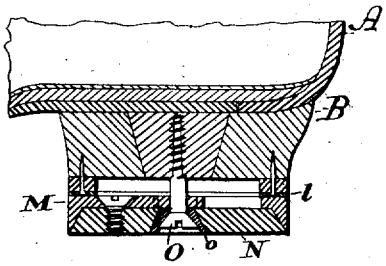
Figure 6:
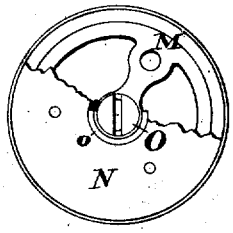

In the drawings, Figure 1 is a sectional view of the heel and plate, taken transversely on the line *y y* in Fig. 2. Fig. 2 is a side elevation of the same. Fig. 3 is a top or plan of the heel-plate detached from the heel. Fig. 4 is a bottom view of Fig. 2, part of the softer material being broken away to show the metal. Figs. 5 and 6 illustrate a slightly-modified form of my invention, the former being a vertical longitudinal mid-section of the heel and plate, and the latter a bottom plan of the plate removed, the soft material of which is partly broken away to show the metal.

A represents the shoe or boot, as the case may be, and B the heel. The latter is represented as made of bass-wood, that being a light, unchangeable, and tough variety, not liable to split. It is not, however, sufficiently dense to afford a good hold for screw-threads, and I introduce a conical plug, *a*, of harder wood, as lignum-vitæ, in its interior to receive the axial screw O, on which the heel-plate is to rotate.

To the under face of the heel is secured a friction plate or washer, *l*, and on this rests a flanged plate or receptacle, M, of metal, to hold the leather or rubber bearing-surface or lift N.

In Figs. 2 and 4 I have shown the flange around the rim of the plate M divided into teeth or points *m m*. When the lift N is pressed into the receptacle M these points puncture the soft material with tolerable facility, and tend to compress the edge of the same and render it dense. In Figs. 5 and 6 the flange is shown intact and in the form of a raised rim.

A cement may or may not be employed to assist in joining the lift to the metal.

The plate should be free to revolve with slight resistance. This rotation I provide for by means of a central axial screw, O, which passes through the heel-plate and embeds itself in the heel, forming an axis for the plate to revolve upon.

To prevent the screw O from getting loose, it may be hollow and another and slenderer screw, *n*, be passed through it. This takes into the heel deeper, thus locking the first screw fast.

In Figs. 5 and 6 it will be seen that the tubular screw is dispensed with and a single screw is employed, this latter passing through a conical tubular washer, *o*, embedded in the softer part of the heel-plate.

In addition to the other attachments mentioned, the softer part N of the heel-plate may be secured to the metal part by means of screws, as shown.

The heel-plate impinges upon the washer *l* only at the margin, so as to leave an open space or cavity between the revolving portion and the heel, except at the edge. This serves to reduce the friction between the parts and to insure contact at the edges between the rotating part and the fixed part.

It is also obvious that this hollow beneath the plate permits the axial screw, if slightly forced, to draw up the central part of the plate and insure some elasticity in the frictional pressure at the margin, which is very desirable.

Among the various modifications of which certain portions of my invention are susceptible may be mentioned the employment of rubber, preferably vulcanized, between the friction-washer and the heel, or the employment of a false friction-washer a little below the main one, with rubber between the two. Rubber or other springs in either of these positions tend to reduce the concussion in walking, and especially to diminish the wear of the heel-plate, by removing the rigidity of the metallic part acting upon its filling.

I claim—

1. A compound heel-lift composed of a flanged plate, M, a top lift, N, of softer material, set in the flanged plate, and a conical washer, *o*, set in the top lift, the latter being compressed between the central washer and the flange of the plate, in combination with the shoe or boot heel and the axial uniting-screw O, all arranged substantially as and for the purposes set forth.

2. The combination of the flanged plate M, the top lift, N, the conical washer *o*, and the axial screw O with the solid heel B and the washer *l*, fixed rigidly thereto, whereby the tightening of the axial screw serves to compress the softer plate between the conical washer and the flange of the plate M, substantially as set forth.

In witness whereof I have hereunto signed my name in the presence of two subscribing witnesses.

JOHN MORRISON HUNTER.

Witnesses:
HENRY CONNETT,
ARTHUR C. FRASER.